(12) United States Patent
Goodman et al.

(10) Patent No.: US 12,505,047 B2
(45) Date of Patent: *Dec. 23, 2025

(54) PRIVATE MEMORY MANAGEMENT USING UTILITY THREAD

(71) Applicant: Apple Inc., Cupertino, CA (US)

(72) Inventors: Benjiman L. Goodman, Cedar Park, TX (US); Terence M. Potter, Austin, TX (US); Anjana Rajendran, Austin, TX (US); Mark I. Luffel, Austin, TX (US); William V. Miller, Austin, TX (US)

(73) Assignee: Apple Inc., Cupertino, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 18/362,686

(22) Filed: Jul. 31, 2023

(65) Prior Publication Data

US 2023/0385201 A1   Nov. 30, 2023

Related U.S. Application Data

(63) Continuation of application No. 16/995,450, filed on Aug. 17, 2020, now Pat. No. 11,714,759.

(51) Int. Cl.
*G06F 12/00* (2006.01)
*G06F 9/38* (2018.01)
(Continued)

(52) U.S. Cl.
CPC ........ *G06F 12/1009* (2013.01); *G06F 9/3887* (2013.01); *G06F 9/3888* (2023.08);
(Continued)

(58) Field of Classification Search
CPC .. G06F 12/1009; G06F 9/3887; G06F 9/3888; G06F 2212/657; G06F 12/0842;
(Continued)

(56) References Cited

U.S. PATENT DOCUMENTS

| 5,873,120 A | 2/1999 | Harvey et al. |
| 9,448,930 B2 | 9/2016 | Asaro et al. |

(Continued)

FOREIGN PATENT DOCUMENTS

| CN | 107704324 A | 2/2018 |
| EP | 0919928 A2 | 6/1999 |

OTHER PUBLICATIONS

Nathan Brookwood, "NVIDIA Solves the GPU Computing Puzzle," An Insight 64 White Paper; Sponsored by NVIDIA; Sep. 2009, 9 pages.

(Continued)

*Primary Examiner* — Arvind Talukdar
(74) *Attorney, Agent, or Firm* — Kowert, Hood, Munyon, Rankin & Goetzel, P.C.; Michael B. Davis; Dean M. Munyon (57) ABSTRACT

Techniques are disclosed relating to private memory management using a mapping thread, which may be persistent. In some embodiments, a graphics processor is configured to generate a pool of private memory pages for a set of graphics work that includes multiple threads. The processor may maintain a translation table configured to map private memory addresses to virtual addresses based on identifiers of the threads. The processor may execute a mapping thread to receive a request to allocate a private memory page for a requesting thread, select a private memory page from the pool in response to the request, and map the selected page in the translation table for the requesting. The processor may then execute one or more instructions of the requesting thread to access a private memory space, wherein the execution includes translation of a private memory address to a virtual address based on the mapped page in the translation table. The mapping thread may be a persistent thread for which resources are allocated for an entirety of a (Continued)

time interval over which the set of graphics work is executed.

18 Claims, 8 Drawing Sheets

(51) Int. Cl.
*G06F 12/1009* (2016.01)
*G06T 1/20* (2006.01)
*G06T 1/60* (2006.01)

(52) U.S. Cl.
CPC ............... *G06T 1/20* (2013.01); *G06T 1/60* (2013.01); *G06F 2212/657* (2013.01)

(58) Field of Classification Search
CPC ....... G06F 2212/1044; G06F 2212/651; G06F 12/109; G06F 12/0207; G06F 2212/455; G06T 1/20; G06T 1/60; Y02D 10/00
See application file for complete search history.

(56) References Cited

U.S. PATENT DOCUMENTS

| | | | |
|---|---|---|---|
| 9,747,218 B2 | 8/2017 | Godard et al. | |
| 10,552,937 B2 | 2/2020 | Cooray et al. | |
| 2004/0160446 A1* | 8/2004 | Gosalia | G06F 9/5016 345/503 |
| 2006/0190945 A1* | 8/2006 | Kissell | G06F 9/3851 718/108 |
| 2017/0045941 A1 | 2/2017 | Tokubo et al. | |
| 2017/0123996 A1 | 5/2017 | Kishan et al. | |
| 2017/0188154 A1 | 6/2017 | Werris | |
| 2018/0373561 A1* | 12/2018 | Nassi | G06F 9/5044 |
| 2019/0042304 A1* | 2/2019 | Wang | H04L 47/2441 |
| 2020/0098082 A1 | 3/2020 | Gutierrez et al. | |
| 2020/0409865 A1* | 12/2020 | Tzortzatos | G06F 12/109 |

OTHER PUBLICATIONS

International Search Report and Written Opinion in PCT Appl. No. PCT/US2021/019353 mailed Jun. 17, 2021, 12 pages.
Appendix A "Hardware Description Languages" from Neil Weste, David Harris (2010) "CMOS VLSI Design: A Circuits and Systems Perspective" (4th Edition); http://pages.hmc.edu/harris/cmosvlsi/4e/cmosvlsidesign_4e_App.pdf; pp. 699-784. [Retrieved Oct. 14, 2021].
"Hardware description language"; Wikipedia; https://en.wikipedia.org/w/index.php?title=Hardware_description_language&oldid=1055897548; last edited on Nov. 18, 2021, 11 pages.
Bathen et al. "SPMVisor: Dynamic Scratch Pad Memory Virtualization for Secure, Low Power, and High Performance Distributed On-Chip Memories." Oct. 2011. ACM. CODES+ISSS'11. pp. 79-88.
Tian et al. "A Full GPU Virtualization Solution with Mediated Pass-Through." Jun. 2014. USENIX. ATC '14. pp. 121-132.
Xing et al. "Intel® Software Guard Extensions (Intel® SGX) Software Support for Dynamic Memory Allocation inside an Enclave." Jun. 2016. ACM. HASP 2016. pp. 1-9.

* cited by examiner

PRIVATE MEMORY MANAGEMENT USING UTILITY THREAD

The present application is a continuation of U.S. application Ser. No. 16/995,450, entitled "Private Memory Management using Utility Thread," filed Aug. 17, 2020 (now U.S. Pat. No. 11,714,759), the disclosure of which is incorporated by reference herein in its entirety.

BACKGROUND

Technical Field

This disclosure relates generally to computer processors and more particularly to private memory allocation using a utility thread.

Description of the Related Art

Processors such as graphics processing units (GPUs) may use various types of memory spaces. For example, shared memory spaces may be used to share data processed by multiple processor blocks while other blocks such as shader processors may also use private memory space(s) during operation.

DETAILED DESCRIPTION

Organization of this Disclosure

Figure 1A:
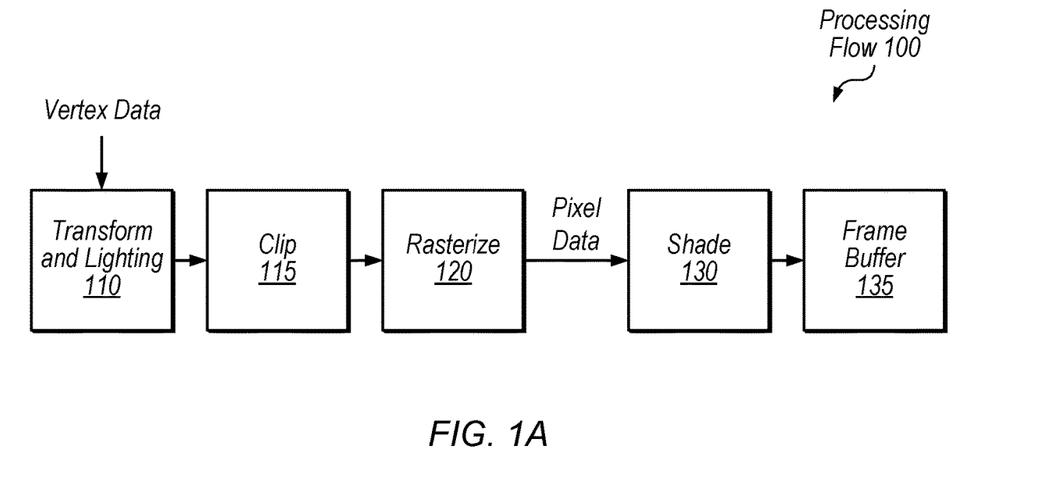
FIG. 1A is a diagram illustrating an overview of example graphics processing operations, according to some embodiments.
Figure 1B:
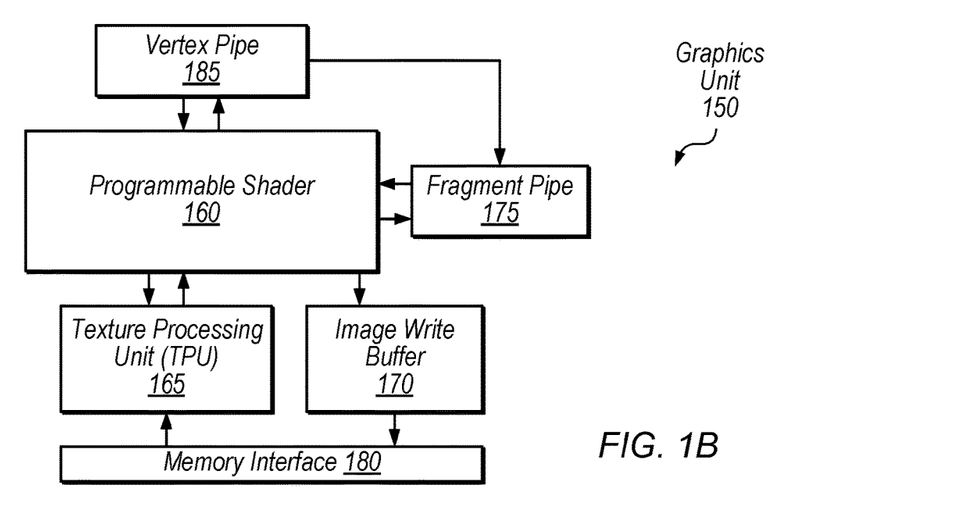
FIG. 1B is a block diagram illustrating an example graphics unit, according to some embodiments.
Figure 2:
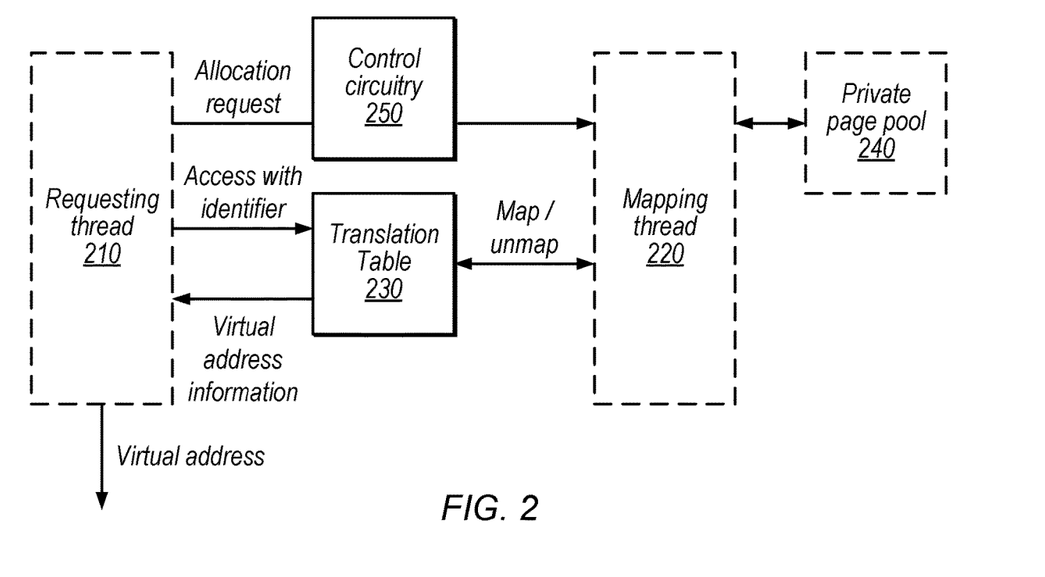
FIG. 2 is a block diagram illustrating example use of a translation table for a private memory space by a requesting thread and a persistent thread, according to some embodiments.
Figure 3:
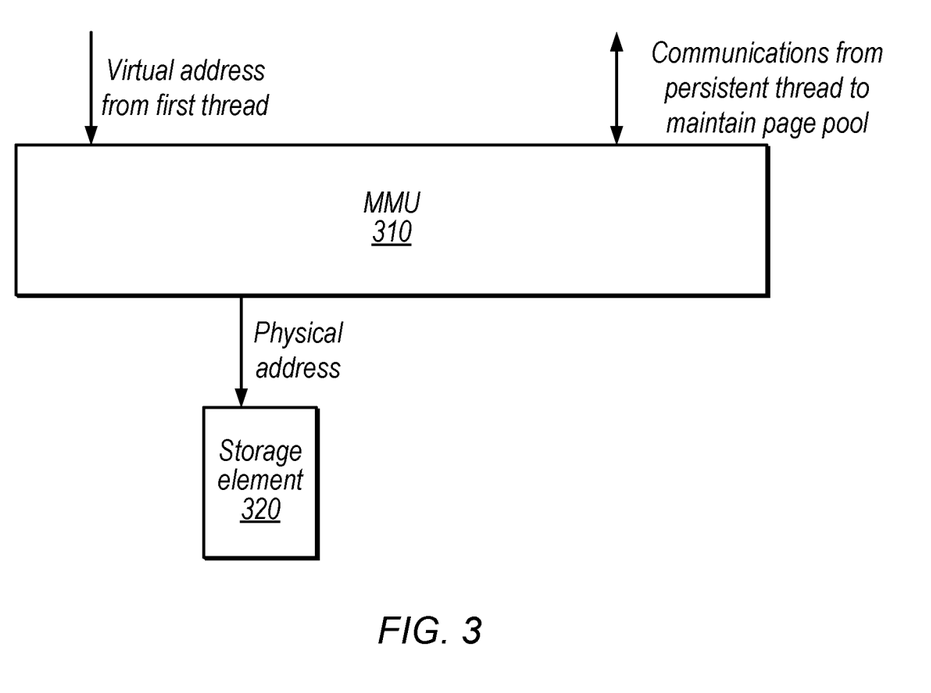
FIG. 3 is a block diagram illustrating an example memory management unit (MMU) according to some embodiments.
Figure 4:
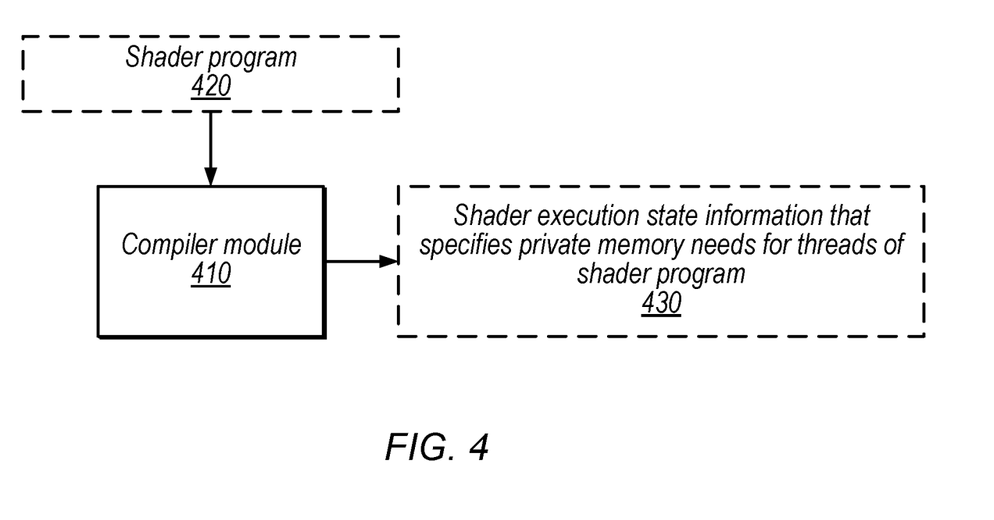
FIG. 4 is a block diagram illustrating an example compiler module configured to generate shader state information, according to some embodiments.
Figure 5:
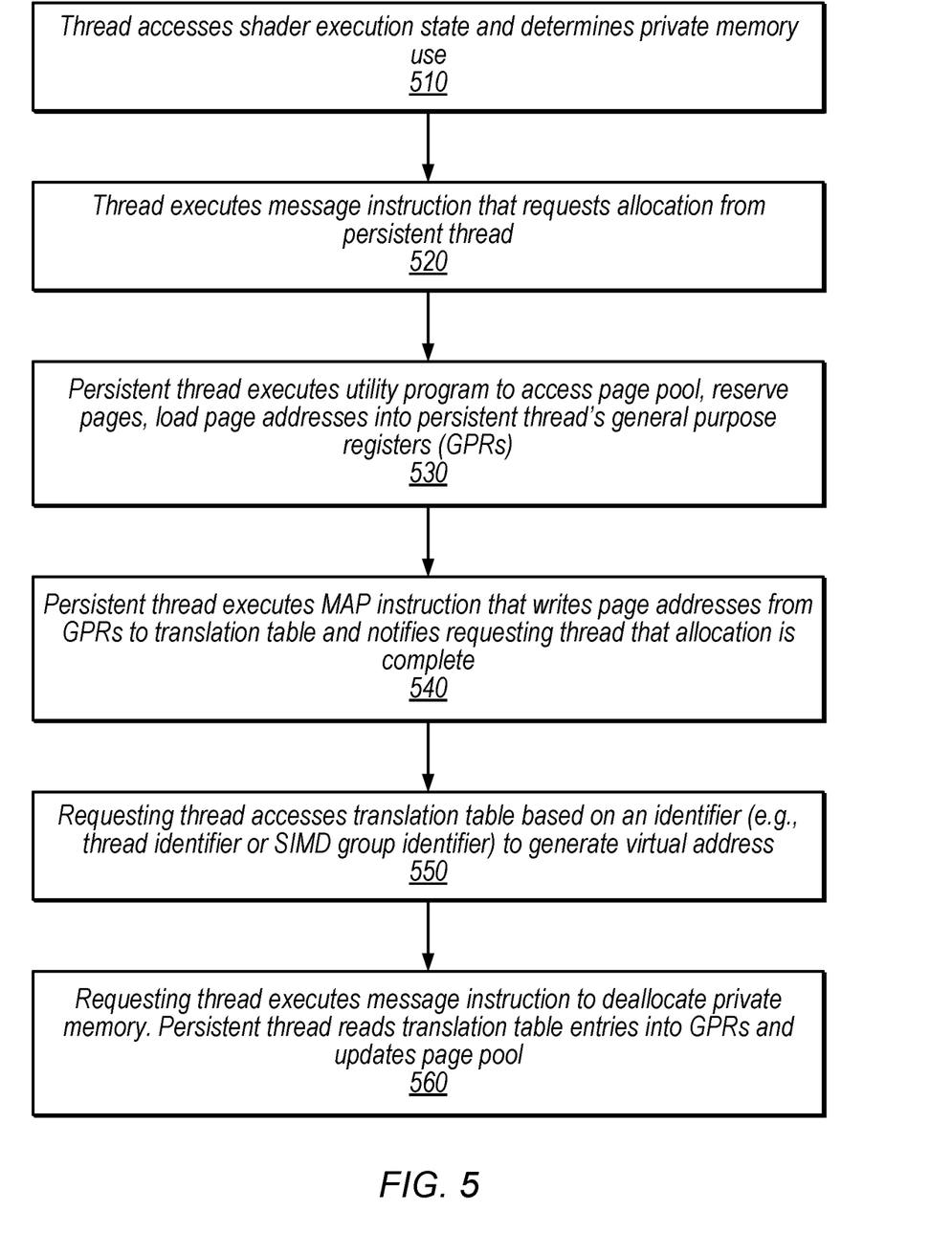
FIG. 5 is a flow diagram illustrating a detailed example method for allocating private memory space using a persistent thread, according to some embodiments.
Figure 6:
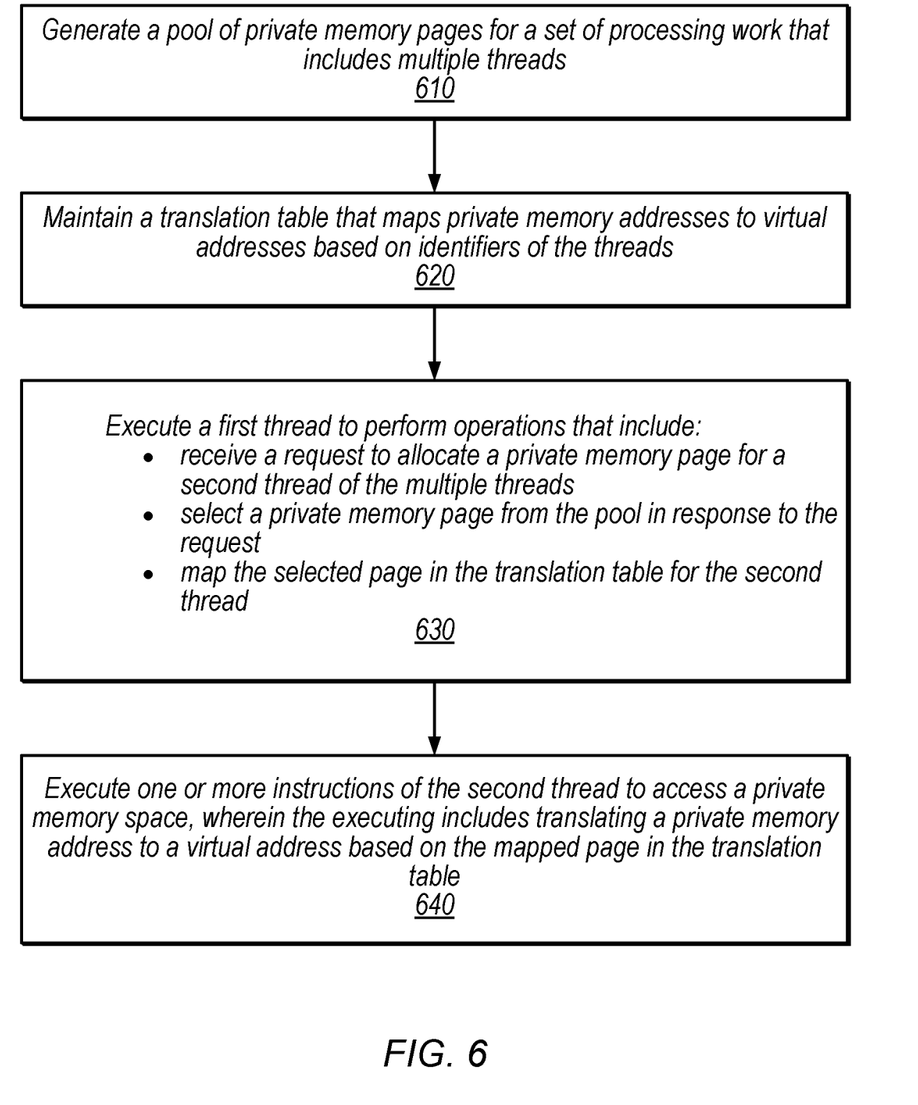
FIG. 6 is a flow diagram illustrating an example method, according to some embodiments.
Figure 7:
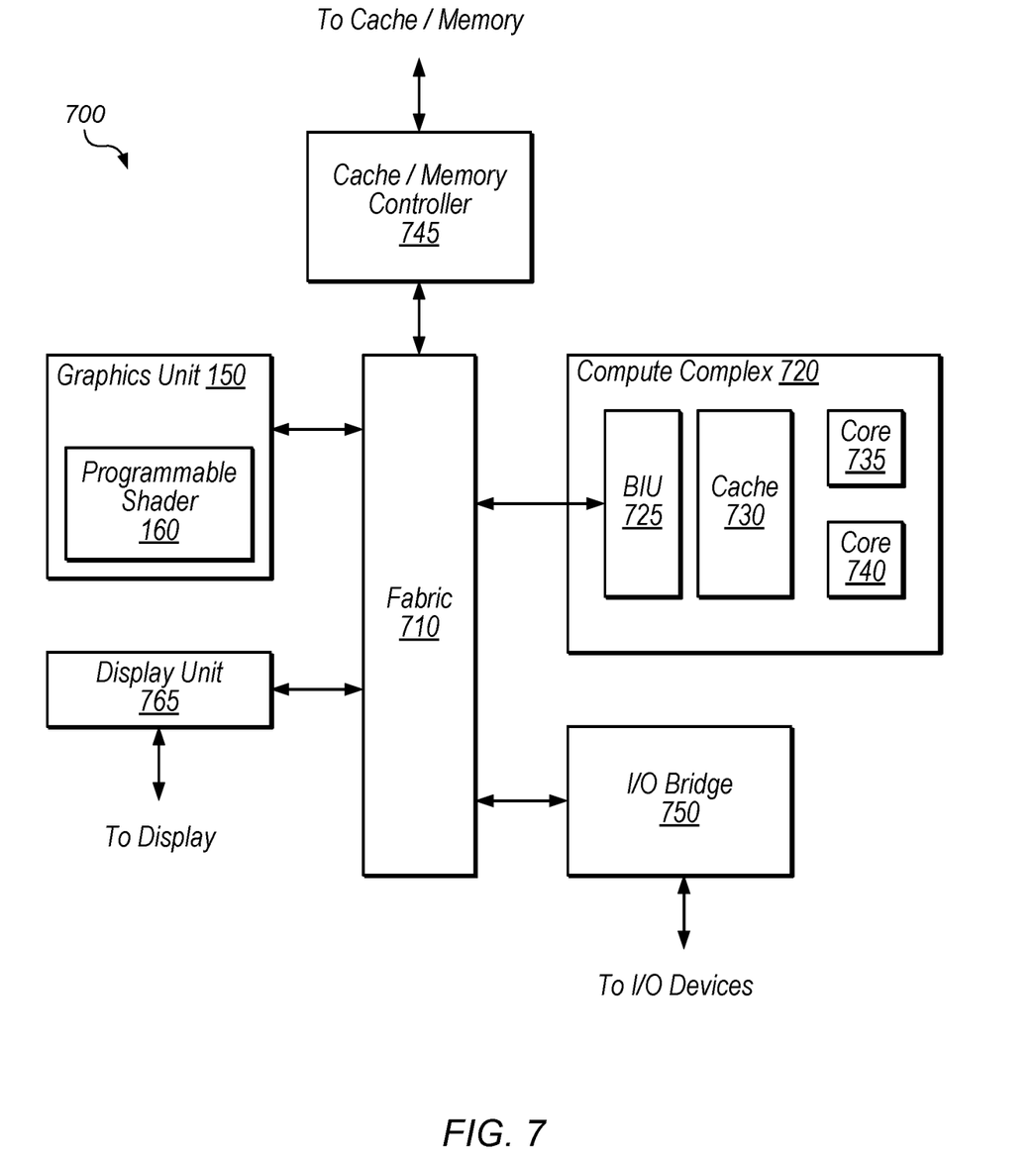
FIG. 7 is a block diagram illustrating an example computing device, according to some embodiments.
Figure 8:
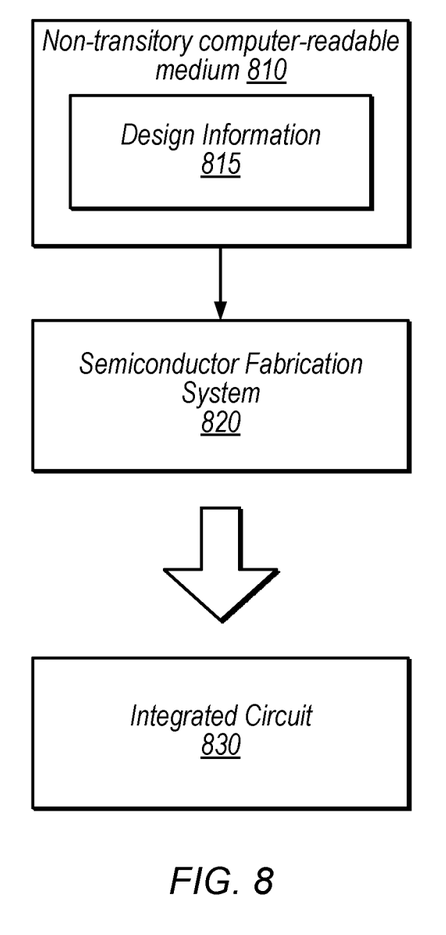
FIG. 8 is a block diagram illustrating an example computer-readable medium that stores circuit design information, according to some embodiments.

FIGS. 1A-1B provide an overview of graphics processing techniques. FIG. 2 provides example private memory management techniques using a mapping thread, which may be persistent. FIGS. 3-5 provide example embodiments of a memory management unit for multi-level address translation, a compiler configured to generate shader state information, and a detailed method. FIGS. 6-8 provide an example generalized method, computing device, and computer-readable medium that stores design information. In various embodiments, disclosed techniques may reduce the time that private memory is allocated (e.g., relative to allocating memory in advance) which may reduce overall memory use. Further, disclosed techniques may provide flexibility in allocating private memory storage for different tasks, provide quick translations, allow determinations whether sufficient virtual pages are available for a given task, reduce software memory footprints, etc.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Example Private Memory Allocation Using a Persistent Thread

Graphics shader processors typically use a private memory space, e.g., to store data while executing a set of graphics work before writing results to a shared memory space. Providing fixed private memory allocations for these processors may be inefficient in certain scenarios, e.g., when some execution paths for a program use a substantially larger memory footprint than others, when it is of value to migrate work from one part of a GPU to another (e.g., to move a background process to give resources to higher-priority work), and when programs have different types of memory needs for different portions (e.g., an application that needs a large thread-private allocation to start but later needs a smaller thread-private allocation paired with a thread-group-private allocation). Further, fixed allocation may not allow sharing memory space between shader processors and other circuitry. Therefore, in disclosed embodiments discussed in detail below, a processor (e.g., a GPU or CPU) is configured to dynamically allocate and map private memory space using a mapping thread.

Disclosed techniques may advantageously provide flexibility in allocating private memory storage for different tasks, provide quick translations, allow determinations whether sufficient virtual pages are available for a given task, reduce software memory footprints, etc. Further, disclosed on-demand allocation techniques may reduce the time that memory is allocated (e.g., relative to allocating memory in advance) which may reduce overall memory use.

FIG. 2 is a block diagram illustrating example use of a translation table for a private memory space by a requesting thread and a mapping thread, according to some embodiments. In the illustrated embodiment, processor circuitry (e.g., programmable shader 160) executes requesting thread 210 and mapping thread 220. The processor circuitry includes translation table 230 and control circuitry 250 and implements a private page pool 240.

As used herein, the term "thread" includes its well-understood meaning in the art and refers to sequence of program instructions that can be scheduled for execution independently of other threads. Multiple threads may be included in a task or process (which may correspond to a computer program). Threads of a given task may or may not share resources such as registers and memory. Thus, context switches may or may not be performed when switching between threads of the same task.

Requesting thread 210, in the illustrated example, requests allocation of private memory. For example, requesting thread 210 may execute a message instruction that causes control circuitry 250 to submit a request to mapping thread 220. The request may include an identifier of the requesting thread (e.g., a thread identifier or a SIMD group identifier), an amount of private memory requested (e.g., a number of pages), etc.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names often used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

Mapping thread 220, in the illustrated embodiment, is configured to map and unmap pages in translation table 230 for requesting threads. In the illustrated example, mapping thread 220 receives the allocation request and accesses private page pool 240 to determine an available virtual memory page. Mapping thread 220 then maps the private memory page to the identifier of the thread in translation table 230. This mapping and a corresponding unmapping may be performed by executing map/unmap instructions. Mapping thread 220 may then notify the requesting thread that the allocation is complete (e.g., via control circuitry 250). Mapping thread 220 may execute a utility program that is allocated a fixed set of execution resources (e.g., a set of general purpose registers). In some embodiments, the utility program may also perform other functions for a kick slot (discussed in detail below) in addition to private memory management.

A thread used to map private memory pages for requesting threads, e.g., by running a utility program, may be "persistent" to different degrees in various embodiments. As one example, the mapping thread may persist during an entire interval in which a set of graphics work (e.g., a kick, explained in detail in the following paragraph) that includes the requesting thread(s) is processed. As another example, the mapping thread may persist longer than the requesting thread. As yet another example, the mapping thread may persist such that it is executed any time a particular processor core is operational. Thus, for first and second threads that request private memory allocation but are not executed in parallel such that the requesting thread completes before the second thread starts, the mapping thread may persist during the lifetimes of both threads. Note that the mapping thread may not always be executing instructions during its lifetime, but may have circuitry allocated for thread state and resources such that the thread is able to handle any incoming map or unmap requests.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy above a certain level until the kick is finished (at which point results may be written to a higher level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of graphics unit 150 are configured to work on a single kick at a time. This set of resources may be referred to as a "kick slot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, a graphics driver maps a new kick to one of multiple kick slots. Each kick slot may include a set of configuration registers and may have a context ID that is indicates a mapping between the kicks virtual addresses and physical addresses. In some embodiments, the graphics driver starts a persistent mapping thread for each kick slot via a configuration register, and starts the persistent mapping thread prior to starting the kick via a configuration register. In some embodiments, a mapping thread may persist across multiple kicks in a kick slot, e.g., if the kicks have the same context ID.

Translation table 230, in some embodiments, facilitates mapping addresses in a private memory space to virtual addresses in a virtual memory space. For example, translation table 230 may include entries that specify mappings between private pages for a given thread and corresponding virtual pages. Thus, each entry may include an identifier associated with a thread, a private page address, and a virtual page address. Translation table 230 may be implemented using dedicated circuitry or may be stored in a virtual memory space.

After mapping thread 220 maps one or more pages in translation table 230 for requesting thread 210, the requesting thread may access its private memory space via the translation table. For example, requesting thread 210 may execute special load/store instructions for private memory and the processor may include specialized execution circuitry configured to execute these instructions by accessing translation table 230. In the illustrated example, in response to an access with the identifier for the requesting thread 210, translation table 230 provides corresponding virtual address information. Requesting thread 210 then uses this information to provide a virtual address to access memory (note that generating the virtual address may be performed by execution circuitry based on execution of the same load or store instruction that causes the private to virtual translation). As discussed in detail below, this virtual address may hit in a cache or may be translated to a physical address to access a storage element.

When the requesting thread 210 is finished using the private memory allocation, it may request that the mapping thread 220 unmap the mapped virtual pages, e.g., such that they are available in the private page pool 240 for other threads.

Control circuitry 250 may be implemented using various circuits to provide communication between different threads. Control circuitry may have access to one or more memory elements accessible to the persistent thread, for example, and may to signal to mapping thread 220 that a mapping is desired by storing a certain value along with a requesting thread's indicator. In some embodiments, control circuitry 250 is configured to arbitrate among multiple threads attempting to request private memory allocation from mapping thread 220.

Private page pool 240 may be stored in virtual memory space. In some embodiments, graphics firmware creates the page pool from available device memory pages. For example, at the beginning of a set of graphics work such as a kick, the firmware may allocate a number of pages based on the maximum amount of private memory that can be requested across all threads of the set of graphics work at a given time. Note that the size of the page pool and the size of allocations requested by executing threads may be based on shader execution state information, as discussed in further detail below with reference to FIG. 4.

Embodiments of FIG. 2 provide a hybrid solution to private memory allocation, in which the mapping thread 220 executes a utility program for certain operations and the processor includes specialized circuitry such as translation table 230 and control circuitry 250 to support operations associated with the allocation (e.g., communications with the mapping thread, loads and stores using the translation table, a mapping instruction executed by the mapping thread, etc.).

Example Multi-Level Translation

FIG. 3 is a block diagram illustrating an example memory management unit (MMU) according to some embodiments. MMU 310, in the illustrated embodiment, is configured to receive a virtual address from the requesting thread 210 and translate the virtual address to a physical address of a location in storage element 320 (e.g., a physical memory). MMU 310 may perform various well-known techniques for such translation such as a page table walk. In some embodiments, MMU 310 is a traditional MMU and need not be aware of how received virtual addresses are generated from private addresses.

Memory accesses to a private memory space may therefore involve multiple translations, e.g., the translation from a private address to a virtual address and a subsequent translation from the virtual address to a physical address. Note that there may be one or more caches between MMU 310 and processor circuitry, one or more caches between MMU 310 and storage element 320, or both. Caches may be accessed using virtual addresses or physical addresses. For accesses with virtual addresses that hit in a cache, MMU 310 may not need to generate a physical address. In some embodiments, the graphics processor may also implement one or more low-level caches that are accessed using private memory addresses.

In the illustrated embodiment, MMU 310 also receives communications from the mapping thread 220 for maintaining the page pool. For example, information specifying the pages in the private page pool may be stored in device memory (e.g., in storage element 320) and mapping thread 220 may issue memory access requests to allocate and deallocate pages from the pool.

Example Shader Execution State

FIG. 4 is a block diagram illustrating an example compiler module configured to generate shader state information, according to some embodiments. In the illustrated embodiment, compiler module 410 receives a shader program 420 and generates shader execution state information that specifies private memory needs for threads of the shader program. The compiler may also generate a compiled program recognized by shader processors of the target graphics processor. The shader execution state may specify a maximum number of private memory pages needed for each thread, for example. Threads may access this information in order to request an appropriate amount of private memory from the mapping thread. Graphics firmware may also access the shader execution state to determine a maximum number of private memory pages needed at any given time for a set of graphics work such as a kick. The graphics firmware may provide an appropriate number of pages to private page pool 240 based on the shader execution state information.

Detailed Example Allocation Procedure

FIG. 5 is a flow diagram illustrating a detailed example method for allocating private memory space using a persistent thread, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, a thread accesses its shader execution state and determines the amount of private memory needed by its shader. This shader execution state may have been generated by a compiler for the thread, for example.

In some embodiments, prior to execution of the thread, GPU firmware creates a pool of private memory pages based on shader execution state for a set of graphics work such as a kick. The size of the pool may therefore be different for different sets of graphics work. The pool may specify a set of virtual memory pages that are available for use in a private memory space for the set of graphics work. Private memory pages for use by the thread of element 510 may be provided from this pool.

At 520, in the illustrated embodiment, the thread executes a message instruction that requests private memory allocation from a persistent thread. This message instruction may be inserted by a compiler without requiring a graphics programmer to specify requests for private memory allocation.

At 530, in the illustrated embodiment, the persistent thread executes a utility program to perform multiple operations. It first accesses the page pool (e.g., to determine a list of free pages) and reserves a number of pages to satisfy the request. It then stores addresses of the reserved pages into its general purpose registers.

In some embodiments, a graphics processor executes multiple persistent threads that can map pages, e.g., one or more persistent threads per core. In these embodiments, the utility program of the persistent thread may use atomic instructions (e.g., a lock before the map instruction and an unlock after the map instruction) to atomically add or remove pages from the page pool.

At 540, in the illustrated embodiment, the persistent thread issues a MAP instruction that writes the page addresses from the general purpose registers to the private memory translation table (in particular, an entry of the translation table for the thread that issued the request). The persistent thread also notifies the requesting thread that the allocation is complete. In some embodiments, if there are multiple threads issuing message requests, arbitration circuitry may arbitrate access to the persistent thread(s), e.g., using a priority-based or round-robin arbitration scheme.

At 550, in the illustrated embodiment, the requesting thread accesses the translation table based on an identifier to generate a virtual address for an access to the private memory space. For example, the identifier may be a thread identifier. As another example, the identifier may be a SIMD group identifier and the private memory may be accessed in an interleaved fashion based on the requesting thread's position in the SIMD group. In these embodiments, the translation table may include storage for up to N virtual page addresses for a SIMD group, where N times the page size represents a greatest amount of private memory that can be required at one time by all threads in the SIMD group.

In some embodiments, the requesting thread executes a special load or store instruction for accessing private memory space, where these instructions access the translation table to translate a specified private memory address to a virtual address.

At 560, in the illustrated embodiment, the requesting thread executes another message instruction to deallocate its private memory. In response, a persistent thread reads the translation table entries for the requesting thread into its GPRs and uses this address information to update the page pool, e.g., by executing an UNMAP instruction that updates the free page list using global stores. This update to the page pool may also be performed atomically. In some embodiments, the MAP and UNMAP instructions may set and clear validity fields in translation table entries and the translation table may treat accesses to invalid entries as out-of-range exceptions. Therefore, threads should not request a private memory translation until their private memory page(s) have been mapped.

In some embodiments, the processor is configured to delay deallocations in the translation table 230, e.g., until the end of a kick. This may allow subsequent threads from the same kick to reuse private memory pages without having to re-execute the utility program of the mapping thread. In these embodiments, translation table entries may include a size field and a context ID field to facilitate re-use.

In some embodiments, the processor may use private memory for thread-level context save and restoration. In some embodiments, rather than allocating storage for context switches early on, the processor may wait until firmware issues a context save request, determine how many threads will be preempted, and use the mapping thread 220 to map an appropriate number of pages for the context to be saved for those threads.

In some embodiments, the utility program executed by mapping thread 220 is configured to obtain more pages than requested from the page pool 240. This may reduce latency for subsequent allocation requests, e.g., by avoiding a need to atomically update the free list for a subsequent mapping request. The additional pages may also be pulled into a data cache such that they are accessible with low latency when mapping new pages to translation table entries for a subsequent request.

Example Method

FIG. 6 is a flow diagram illustrating an example method for mapping a private memory page, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a processor (e.g., graphics unit 150) generates a pool of private memory pages (e.g., private page pool 240) for a set of processing work that includes multiple threads.

At 620, in the illustrated embodiment, the processor maintains a translation table (e.g., translation table 230) that maps private memory addresses to virtual addresses based on identifiers of the threads. In some embodiments, the identifiers are SIMD group identifiers and the private memory space is interleaved based on a thread's position in its SIMD group.

At 630, in the illustrated embodiment, the processor executes a first thread (e.g., mapping thread 220) to perform operations that include: receiving a request to allocate a private memory page for a second thread of the multiple threads (e.g., requesting thread 210), selecting a private memory page from the pool in response to the request, and mapping the selected page in the translation table for the second thread.

In some embodiments, the first thread executes a map instruction to map the selected page in response to an allocation request instruction executed by the second thread. The allocation request instruction may be specified by a field of a more generic instruction (e.g., a message instruction) or may be a dedicated instruction for requesting private memory allocation. In some embodiments, the processor is configured to execute the first thread to load one or more page addresses into general purpose registers of the first thread. In these embodiments, the map instruction may write the page addresses from the general purpose registers to a translation table entry for the second thread.

In some embodiments, the first thread is a persistent thread for which resources are allocated for an entirety of a time interval over which the set of graphics work (e.g., a kick) is executed. The first thread may persist over various intervals in other embodiments or situations. In some embodiments, the processor is further configured to translate the virtual address to a physical address of a location in a memory device.

In some embodiments, the second thread is configured to request to allocate a first number of private memory pages based on shader execution state information for the second thread, wherein the shader execution state information was received from an external source (e.g., from a compiler in association with program code for the second thread) prior to the execution. In some embodiments, the processor also determines a size for the pool of private memory pages based on the shader execution state information, e.g., where the shader execution state information indicates private memory requirements of the multiple threads in the set of graphics work.

At 640, in the illustrated embodiment, the processor executes one or more instructions of the second thread to access a private memory space, wherein the executing includes translating a private memory address to a virtual address based on the mapped page in the translation table.

In some embodiments, the processor is configured to execute multiple threads that include a utility program executable to modify the translation table and the multiple threads use atomic operations to modify the translation table. This may ensure that the translation table does not become incorrect due to conflicting accesses, for example. In some embodiments, arbitration circuitry is configured to select from among multiple threads requesting allocation of private memory from the first thread.

In some embodiments, the processor is configured to delay de-allocation of the private memory page until the end of a group of processing work and to allow one or more other threads to use the private memory page.

In some embodiments, the processor is configured to determine a number of threads to be preempted in response to a preemption request and allocate, based on the determination, a number of private memory pages to save preempted threads' state. In some embodiments, the processor is configured to allocate one or more additional unrequested private memory pages to reduce latency of one or more subsequent allocation requests.

Example Device

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 150, and display unit 765. In some embodiments, device 700 may include other components (not shown) in addition to and/or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. Programmable shader 160, in various embodiments, may include highly parallel execution cores configured to execute graphics programs, which may include pixel tasks, vertex tasks, and compute tasks (which may or may not be graphics-related).

In some embodiments, graphics unit 150 includes the circuitry discussed herein. In other embodiments, the disclosed circuitry may be implemented in other types of processors, such as CPUs, for example.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 700 with connectivity to various types of other devices and networks.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIG. 1B, 2, 3, or 7. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

For purposes of interpreting the appended claims or claims drafted during prosecution of this application or an application claiming priority thereto, public notice is given that the appended claims are intended to be interpreted in accordance with any specific disclosure provided above, as well as the following principles, definitions, and explanations.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "shader processor configured to execute a shader program" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a processor for a graphical processing unit configured to generate a private memory page;
   a memory coupled to the processor and configured to store a translation table;
   the processor further configured to:
      receive a request to execute a first thread, wherein the first thread is associated with a first thread identifier;
      generate a virtual memory address;
      associate the virtual memory address with the private memory page in the translation table;
      access shader execution state information;
      associate, based on the shader execution state information, the private memory page with the first thread identifier in the translation table;
      retrieve the virtual memory address associated with the private memory page;
      execute an instruction of the first thread; and
      access the virtual memory address based on the executed instruction of the first thread.

2. The apparatus of claim 1, wherein:
   the processor is further configured to;
      generate a second private memory page;
      receive a request to execute a second thread, wherein the second thread is associated with a second thread identifier;
      generate a second virtual memory address;
      associate the second virtual memory address with the private memory page in the translation table;
      associate the second private memory page with the second thread identifier in the translation table;
      retrieve the second virtual memory address associated with the second private memory page;
      execute an instruction of the second thread; and
      access the second virtual memory address based on the executed instruction of the first thread.

3. The apparatus of claim 1, wherein the processor is further configured to translate the virtual memory address to a physical address of a location in a memory device.

4. The apparatus of claim 1, wherein the processor is further configured to:
   determine a size for a pool of private memory pages based on the shader execution state information; and
   generate a pool of private memory pages with the determined size, the pool of private memory pages comprising the private memory page.

5. The apparatus of claim 1, wherein the processor is further configured to load a page address into a general purpose register based on the first thread.

6. The apparatus of claim 1, wherein the processor is further configured to:
   determine the end of the execution of the instruction of the first thread; and
   in response to determining the end of the execution of the instruction, de-associate the private memory page with the first thread identifier in the translation table.

7. The apparatus of claim 1, wherein the first thread identifier is a SIMD group identifier.

8. The apparatus of claim 1, wherein the first thread is a persistent thread associated with a set of graphics work for which the processor is allocated until the set of graphics work is executed.

9. The apparatus of claim 1, wherein a private memory space corresponding to the private memory page is interleaved.

10. A method, comprising:
    generating, by a processor, a private memory page;
    storing a translation table in a memory;
    receiving, by the processor, a request to execute a first thread, wherein the first thread is associated with a first thread identifier;
    generating, by the processor, a virtual memory address;
    associating, by the processor, the virtual memory address with the private memory page in the translation table;
    accessing, by the processor, shader execution state information;
    associating, by the processor based on the shader execution state information, the private memory page with the first thread identifier in the translation table;
    retrieving, by the processor, the virtual memory address associated with the private memory page;
    execute, by the processor, an instruction of the first thread; and
    accessing, by the processor, the virtual memory address based on the executed instruction of the first thread.

11. The method of claim 10, further comprising:
    generating, by the processor, a second private memory page;
    receiving, by the processor, a request to execute a second thread, wherein the second thread is associated with a second thread identifier;
    generating, by the processor, a second virtual memory address;
    associating, by the processor, the second virtual memory address with the private memory page in the translation table;
    associating, by the processor, the second private memory page with the second thread
    identifier in the translation table;
    retrieving, by the processor, the second virtual memory address associated with the second private memory page;
    executing, by the processor, an instruction of the second thread; and accessing, by the processor, the second virtual memory address based on the executed instruction of the first thread.

12. The method of claim 10, further comprising translating the virtual memory address to a physical address of a location in a memory device.

13. The method of claim 10, further comprising:
determining a size for a pool of private memory pages based on the shader execution state information; and
generating a pool of private memory pages with the determined size, the pool of private memory pages comprising the private memory page.

14. The method of claim 10, further comprising loading a page address into a general purpose register based on the first thread.

15. The method of claim 10, further comprising:
determining the end of the execution of the instruction of the first thread; and
in response to determining the end of the execution of the instruction, de-associating the private memory page with the first thread identifier in the translation table.

16. The method of claim 10, wherein the first thread identifier is a SIMD group identifier.

17. The method of claim 10, wherein the first thread is a persistent thread associated with a set of graphics work for which the processor is allocated until the set of graphics work is executed.

18. The method of claim 10, wherein a private memory space corresponding to the private memory page is interleaved.

* * * * *